TRANSMISSION NETWORK FOR EMPHASIZING THE HIGH-FREQUENCIES OF APPLIED OSCILLATIONS

Filed Feb. 12, 1947

G. HEPP
INVENTOR
BY Fred M. Vogel
AGENT

Patented Apr. 8, 1952 2,591,936

UNITED STATES PATENT OFFICE 2,591,936

TRANSMISSION NETWORK FOR EMPHASIZING THE HIGH-FREQUENCIES OF APPLIED OSCILLATIONS

Gerard Hepp, Eindhoven, Netherlands, assignor to Hartford National Bank and Trust Company, Hartford, Conn., as trustee Application February 12, 1947, Serial No. 728,046
In the Netherlands July 6, 1944

Section 1, Public Law 690, August 8, 1946
Patent expires July 6, 1964

5 Claims. (Cl. 178—44)

Figure 1:
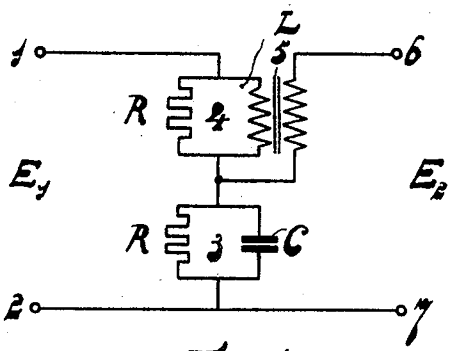

This invention relates to a network for the transmission of electric oscillations, in which the high frequencies are favoured above the low frequencies. Such a network is used for example in transmitters for the transmission of frequency-modulated oscillations, this emphasizing of the high frequencies being referred to as pre-emphasis. This pre-emphasis has the advantage of greater anti-interference, the high modulation frequencies, which generally have a low amplitude, being favoured to such an extent as to be caused to lie above the interference level. The said favouring of the high modulation frequencies must naturally be undone in the receiver prior to reception. It is therefore necessary for favouring the high frequencies to fix a norm to be taken into account when designing the receiver. As normal pre-emphasis is generally looked upon the relative favouring of the high modulation frequencies, as is secured by feeding the modulating oscillations to an amplifying valve whose anode circuit includes the series combination of an inductance coil and a resistance, the ratio between inductance and resistance yielding a time constant of about $10^{-4}$ sec. In this case, the amplification of the high modulation frequencies is about tenfold that of the low frequencies.

A disadvantage of these circuit arrangements is that the inductance has to be so low that the tube capacities are still of no importance and this, in view of the prescribed time constant value of $10^{-4}$ sec., due to the ratio between inductance and resistance, leads to very low values for the resistance. Thus, if the said amplifying valve is coupled to the final stage of the amplifier and the latter has a strong negative feedback in order to reduce the non-linear distortion (the permissible distortion in such an amplifier lies far below 1%), the amplitude of the modulating oscillation fed to the grid of the amplifier valve must be large, so that, at a low value of the resistance in the anode circuit, the tube has passing through it a high anode-current and this entails considerable distortion. It is frequently impossible to suppress this distortion by negative feedback of the amplifier, because the total amplification no longer suffices in this case, since it is found to be practically impossible to ensure sufficient amplification throughout a large frequency zone at the desired low distortion.

A further method of securing pre-emphasis consists in that the negative feedback circuit of the amplifier for the modulating oscillations includes a network which is constituted in such manner that the low frequencies are negatively back-coupled to a greater extent than the high frequencies. In order to secure a normal pre-emphasis the negative feedback of the low frequencies must be about tenfold that for the high frequencies and at such a strong negative feedback for the low frequencies the amplifier tends to self-oscillate.

The invention has for its object to provide a network for pre-emphasis that can be included in the input circuit of an amplifier, with the result that the disadvantages inherent in the well-known circuit arrangements are avoided.

According to the invention, the network includes the series combination of two impedances inserted between the input terminals, one of the impedances being constituted by the parallel combination of a resistance R and a condenser C and the other by the parallel combination of a resistance R and an inductance L, said circuit elements being so proportioned that $$\frac{L}{C}=R^2$$

and the last-mentioned impedance being inserted between the output terminals of the network via a step-up transformer in series with the first-mentioned impedance.

In order that the invention may be clearly understood and readily carried into effect, it will now be described more fully with reference to the accompanying drawing, in which three embodiments of the network according to the invention are illustrated. In the network shown in Fig. 1, the input terminals have inserted between them the series combination of two impedances 3 and 4. The former is constituted by the parallel combination of a resistance R and a condenser C and the latter by the parallel combination of a resistance R and an inductance L, which is formed by the primary inductance of a step-up transformer 5 whose ratio of transformation is $1:n_2$.

If the output terminals 6, 7 are practically unloaded and the input terminals 1, 2 have supplied to them a voltage $E_1$, the output voltage $E_2$ is:

$$E_2=\frac{\frac{R}{1+j\omega CR}+\frac{j\omega L}{1+j\omega\frac{L}{R}}n_2}{\frac{R}{1+j\omega C.R}+\frac{j\omega L}{1+j\omega\frac{L}{R}}}E_1$$

or if $$\frac{L}{C}$$

is assumed to be $=R^2$ and $$\frac{L}{R}$$

is assumed to be $=CR=\beta$ $$E_2=\frac{1+j\omega n_2\beta}{1+j\omega\beta}E_1$$

If $n_2\beta$ is equalized with $10^{-4}$ sec., a normal pre-emphasis, apart from the factor $1+j\omega\beta$ in the nominator, is obtained. This factor $1+j\omega\beta$ is negligible in many cases, that is to say if the ratio of transformation $n_2$ is high. If for example the highest frequency to be transmitted is to be favoured over the lowest frequencies by a factor 10, so that $\omega n_2\beta$ is 10 at this frequency, $$\omega\beta=\frac{10}{n_2}$$

so that for $n_2 \gg 10$, is $\omega\beta$ in the nominator is negligible relatively to 1. If this is not permissible, a correction must be made. The required correction is however so small that it can be made simply by means of a network in the amplifier itself or in the negative feedback circuit.

Figure 2:
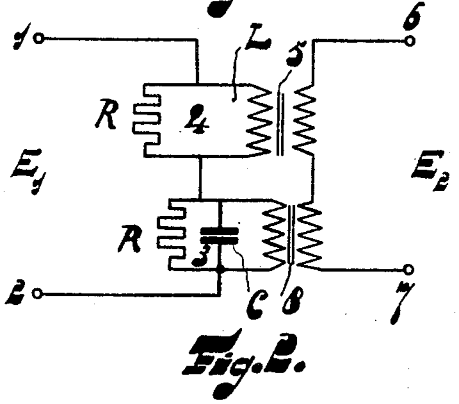

The network shown in Fig. 2 is distinguished from that in Fig. 1 in that also the impedance 3 is included between the output terminals via a transformer 8 whose ratio of transformation $1:n_1$. Assuming the primary inductance of this transformer to be so large that the impedance formed thereby is negligible relatively to the impedance 3, the output voltage $E_2$ is given by:

$$E_2=n_1\frac{1+j\omega\frac{n_2}{n_1}\beta}{1+j\omega\beta}E_1$$

In order to obtain the normal pre-emphasis, $$\frac{n_2}{n_1}\beta$$

must be equal to $10^{-4}$ sec. The ratio of transformation $n_1$ should be low as compared with the ratio of transformation $n_2$.

Figure 3:
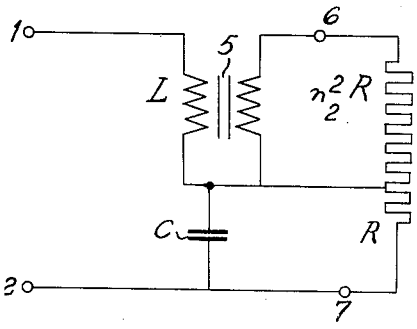

Alternatively, as shown in Fig. 3, instead of connecting the resistance R shown in Fig. 1 in parallel with the primary of the transformer 5, a resistance $n_2^2$ R may be connected in parallel with the secondary. This may be advantageous under certain conditions, for example if the output terminals 6, 7 of the network are loaded by a resistance. In that case, the load resistance may be connected to the network in such manner that a resistance R is connected in parallel with the condenser C and a resistance $n_2^2$ R in parallel with the secondary of the transformer 5, the network behaving in quite the same manner as the network shown in Figure 1.

The network according to the invention, as stated hereinbefore, may be included in the input circuit of an amplifier. In this case, the transformer 8 shown in Fig. 2 may be constituted by the input transformer already included in the input circuit of the amplifier.

Figure 4:
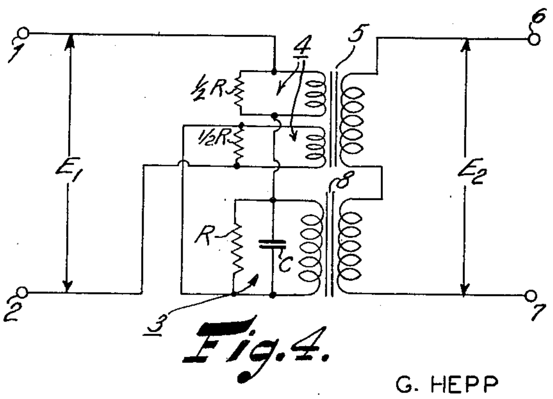

In this case, as shown in Fig. 4, it is preferable that with a push-pull input circuit of the amplifier the primary of the transformer 5 and the resistance R should be split up into two equal halves which should be arranged on either side of the primary of the transformer 8 so that the symmetry of the input circuit with respect to earth is conserved.

What I claim is:

1. A four-terminal network adapted to emphasize the high frequencies relative to the low frequencies of oscillations transmitted therethrough, said network comprising input and output terminals, a voltage step-up transformer having a primary winding and a secondary winding, a first impedance constituted by the primary winding connected in parallel relation with a first resistance, and a second impedance constituted by a capacitance connected in parallel relation with a second resistance having the same value as said first resistance, said first and second impedances being serially connected across the input terminals, said secondary winding being connected in series with said second impedance across the output terminals.

2. A four terminal network adapted to emphasize the high frequencies relative to the low frequencies of oscillations transmitted therethrough, said network comprising input and output terminals, a voltage step-up transformer having a primary winding and a secondary winding, a first impedance constituted by said primary winding connected in parallel relation with a resistor, and a second impedance constituted by a capacitor connected in parallel relation with a resistor, said first and second impedances being serially connected across the input terminals, said secondary winding being connected in series with said second impedance across the output terminals, the elements comprising said network having values at which the following relationship exists:

$$\frac{L}{C}=R^2$$

where L is the inductance of said primary winding, C is the capacitance of said capacitor and R is the resistance of the resistor in said first impedance and the resistor in said second impedance.

3. A four-terminal network adapted to emphasize the high frequencies relative to the low frequencies of audio-frequency oscillations transmitted therethrough, said network comprising input and output terminals, a first voltage step-up transformer having a primary winding and a second winding, a first impedance constituted by the primary winding connected in parallel relation with a resistor, a second impedance network constituted by a capacitor connected in parallel relation with a resistor, the resistors of said impedances having the same value, said first and second impedances being serially connected across said input terminals, and a second voltage step-up transformer having a primary winding connected across said second impedance and a secondary winding connected in series with the secondary winding of said first transformer across said output terminals, said first transformer having a greater step-up ratio than said second transformer.

4. A four terminal network adapted to emphasize the high frequencies relative to the low frequencies of audio-frequency oscillations transmitted therethrough, said network comprising input and output terminals, a first voltage step-up transformer having a primary winding and a second winding, a first impedance constituted by the primary winding connected in parallel relation with a resistor, a second impedance network constituted by a capacitor connected in parallel relation with a resistor, said first and second impedances being serially connected across said input terminals, and a second voltage step-up transformer having a primary winding connected across said second impedance and a secondary winding connected in series with the secondary winding of said first transformer across said output terminals, the elements comprising said network having values at which the following relationship exists:

$$\frac{L}{C}=R^2$$

where L is the inductance of the primary winding of the first transformer, C is the capacitance of said capacitor and R is the resistance of the resistor in said first impedance and the resistor in said second impedance.

5. A four terminal network adapted to emphasize the high-frequencies relative to the low-frequencies of audio oscillations transmitted therethrough, said network comprising input and output terminals, a voltage step-up transformer having a primary winding and a secondary winding, a first impedance constituted by the primary winding connected in parallel relation with a first resistance, a second impedance constituted by a capacitance conneted in parallel relation with a second resistance having the same value as said first resistance, and means coupled to said second impedance to derive a voltage proportional to the voltage developed thereacross with a proportionality factor less than the step-up ratio of said transformer, said secondary winding being connected in series with said coupling means to said output terminals.

GERARD HEPP.

REFERENCES CITED

The following references are of record in the file of this patent:

UNITED STATES PATENTS

| Number | Name | Date |
|---|---|---|
| 1,959,494 | Nyquist | May 22, 1934 |
| 1,976,504 | Lucas | Oct. 9, 1934 |
| 2,025,128 | Rust | Dec. 24, 1935 |
| 2,043,774 | Roberts | June 9, 1936 |
| 2,159,944 | Roberts | May 23, 1939 |
| 2,176,200 | Blumlein | Oct. 17, 1939 |
| 2,282,113 | Brailsford | May 5, 1942 |

OTHER REFERENCES

Proceedings of the Radio Club of America, vol. 7, No. 9, September 1930. Pp 91–96 (6 pages) "Design and Application of Adjustable Tone Compensating Circuits." J. G. Aceves. 178–44.13A. Copy available in the Library of Congress, Washington, D. C.